B. F. McGUINESS.
SHUTTLE CHANGING LOOM.
APPLICATION FILED JUNE 18, 1909.

943,038.

Patented Dec. 14, 1909.
6 SHEETS—SHEET 1.

Fig. 1.

Witnesses
M. Bredt.
M. Haas.

Inventor
Benj. F. McGuiness.
By John C. Dewey
Attorney.

B. F. McGUINESS.
SHUTTLE CHANGING LOOM.
APPLICATION FILED JUNE 18, 1908.

943,038.

Patented Dec. 14, 1909.
6 SHEETS—SHEET 4.

Witnesses
M. Bzedr.
M. Haas.

Inventor
Benj. F. McGuiness.
By John E. Dewey
Attorney.

B. F. McGUINESS.
SHUTTLE CHANGING LOOM.
APPLICATION FILED JUNE 18, 1908.

943,038.

Patented Dec. 14, 1909.
6 SHEETS—SHEET 5.

Witnesses
M. Bredt.
M. Haas

Inventor
Benj. F. McGuiness.
By John C. Dewey
Attorney.

UNITED STATES PATENT OFFICE.

BENJAMIN F. McGUINESS, OF WORCESTER, MASSACHUSETTS, ASSIGNOR TO CROMPTON & KNOWLES LOOM WORKS, A CORPORATION OF MAINE.

SHUTTLE-CHANGING LOOM.

943,038. Specification of Letters Patent. Patented Dec. 14, 1909.

Aplication filed June 18, 1908. Serial No. 439,141.

*To all whom it may concern:*

Be it known that I, BENJAMIN F. McGUINESS, a citizen of the United States, residing at Worcester, in the county of Worcester and State of Massachusetts, have invented certain new and useful Improvements in Shuttle-Changing Looms, of which the following is a specification.

My invention relates to shuttle changing looms, and particularly to a shuttle changing mechanism for looms which have an ordinary single box at each end of the lay, and by means of which mechanism, preferably operated by the weaver, a shuttle having a full supply of filling may be exchanged for a shuttle having the filling substantially or practically exhausted, whenever the weaver desires. Instead of having the mechanism operated by the weaver, I may provide, in connection with my improvements, a pattern surface, which at certain intervals, at a predetermined time, through intermediate connections, will automatically operate the shuttle changing mechanism. For instance, when the loom is weaving a coarse fabric, and the filling is preferably of a coarse character, there is less filling on the bobbin, and the exhaustion of the bobbin will take place in a comparatively short time, and as the weaver knows the amount of filling on the bobbin, a continuously running pattern chain may be made, which will indicate the change of the shuttle after a certain number of picks and when the bobbin in the running shuttle is nearly exhausted, and will, through intermediate connections, put into operation my mechanism, by means of which a new shuttle with a fresh supply of filling will be automatically substituted for the running shuttle having the filling substantially exhausted, without stopping the loom, or losing a pick.

In applying my improvements to a loom, I combine with the single shuttle box, preferably on the right hand end of the loom, a drop box, and switch box mechanism, which may be of the same construction and operation as shown and described in my pending application, Serial No. 350,336. In this instance I provide one box for the running shuttle, and the box for the spare shuttle has its upper part provided with a movable plate, to receive the shuttle to be exchanged, and then leave the lower part free for the spare shuttle to be picked out of its box.

I have only shown in the drawings a detached portion of a loom of the class referred to, with my shuttle changing mechanism combined therewith, sufficient to enable those skilled in the art to understand the construction and operation of the same.

Referring to the drawings.

In the accompanying drawings, 1 are the loom sides, 2 is the breast beam, 3 the arch, 4 the lay sword at the left hand end of the loom, 5 is a stationary shuttle box of ordinary construction, at the left hand end of the lay 6, 7 is the picker stick; 4' is the lay sword at the right hand end of the lay 6, 8 is the shuttle box guide plate, secured to the upper end of the lay sword at the right hand end of the lay 6.

A shuttle box 9, of ordinary construction, to receive the shuttle when the loom is running normally, is supported on the upper end of the shuttle box lifter rod 10. The lower end of the lifter rod 10 is connected with the rocker iron 11, in the usual way. A helically coiled contraction spring 12 is mounted on the lifter rod 10. The lifter rod 10 is connected at its lower end with one end of a flexible connection 13, which passes over sheaves 14 and 15, in the ordinary way, and leads to the box motion lever, to be hereinafter described.

Figure 6:
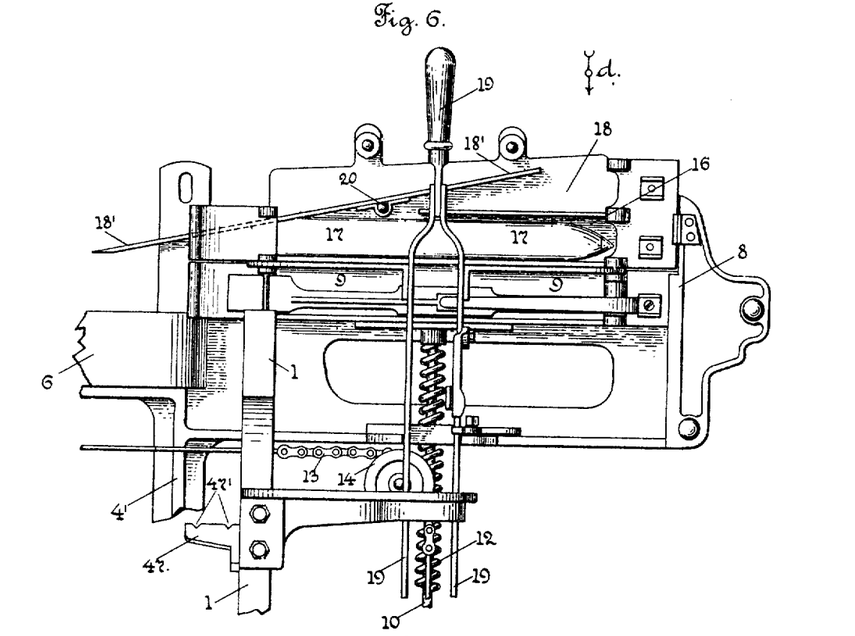
Fig. 6 is a front view of the spare shuttle boxes, looking in the direction of arrow *c*, Fig. 4.
Figure 7:
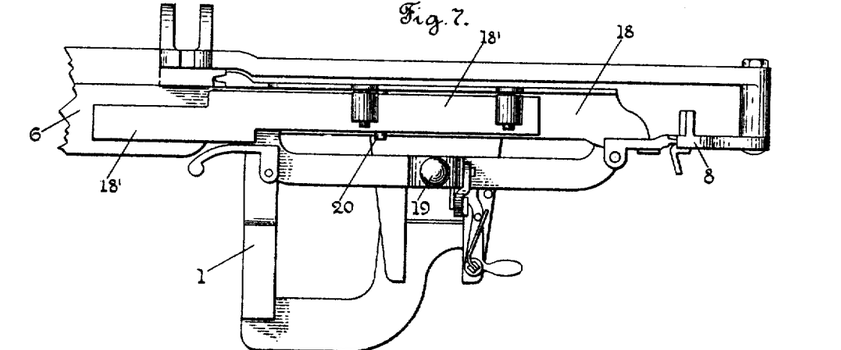
Fig. 7 is a plan view of the parts shown in Fig. 6, looking in the direction of arrow *d*, same figure.
Figure 8:
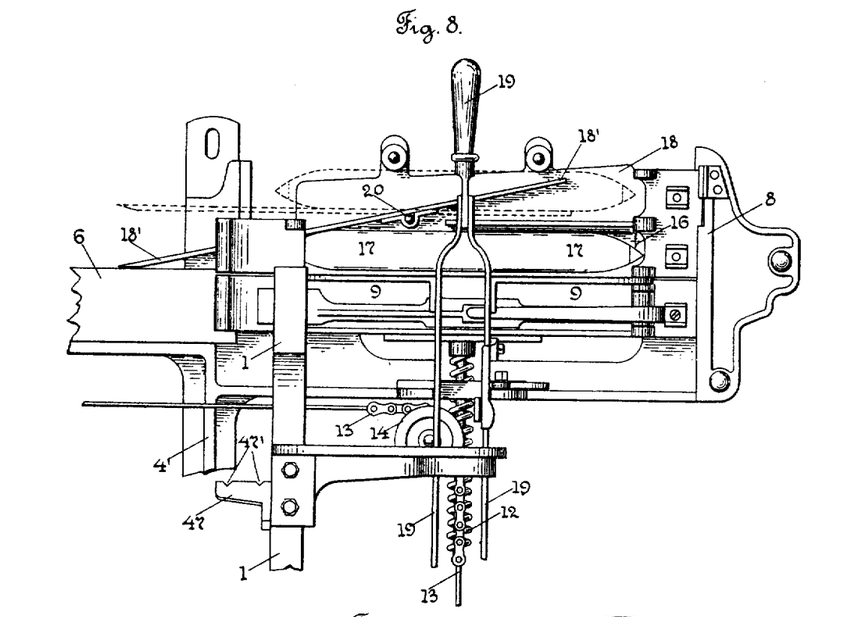
Fig. 8 corresponds to Fig. 6, but shows the spare shuttle boxes in their lowered position when a shuttle is to be exchanged, and looking in the direction of arrow *e*, Fig. 5.

A cell 16 for the spare shuttle 17, and a cell 18 for the shuttle to be exchanged, are in this instance supported upon an upright swinging hand lever 19, which is pivotally connected at its lower end to the box lifter rod 10, to move therewith. The cell 16 is to receive the spare shuttle 17, placed therein by the weaver, and the upper cell 18, which in this instance has a part of the shuttle shelf 18′ thereof pivotally mounted on a stud 20, to have a tilting motion thereon, is to receive the shuttle to be exchanged. The longer end of said tilting shelf extends inwardly, so that the weight thereof will hold the shelf in an inclined position, as shown in Fig. 6, with the inner end thereof in line with the race-way of the lay, as shown in Fig. 8, when the shuttle boxes at the right hand end of the loom are lowered, so that the shuttle to be exchanged will pass up said inclined plate 18′, which acts as a switch plate, and tilt said switch plate into a horizontal position, as shown by broken lines in Fig. 8, leaving the spare shuttle 17 free to be picked from the spare shuttle box 16.

The upright hand lever 19 is substantially of the same construction and operation as the upright hand lever shown and described in my pending application, Serial No. 350,356, above referred to. It is connected to the shuttle box 9, and locked in position, to be raised and lowered with said shuttle box, and is disconnected and moved outwardly, as shown by broken lines in Fig. 4, for the purpose of removing the shuttle having the exhausted filling, and to supply a new shuttle.

I will now describe the box motion shown in the drawings, for raising and lowering the shuttle boxes at the right hand end of the loom, for the normally running shuttle, and for the spare shuttle, and for the shuttle to be exchanged. Fast on the bottom shaft 20 of the loom is in this instance a mutilated, or what is termed a master gear 21, which meshes with and drives a mutilated pinion 22, mounted on a sleeve 23′, and connected therewith in this instance by a spline 23″, to have a sliding motion in the direction of the length of said sleeve, and to rotate with said sleeve. The sleeve 23′ is loosely mounted on a stud 24, secured in a hanger or bracket 25 on a stand 26 on a girt 27 extending between the ends of the loom. On the sleeve 23′ is a crank disk 23, see Fig. 9.

A half revolution of the mutilated pinion 22 and of the crank disk 23 is communicated from the master gear 21, when the respective tooth portions of the mutilated pinion 22 and the master gear 21 are moved into engagement with each other.

The mutilated pinion 22 is moved longitudinally on the sleeve 23′, through the yoke-shaped lever 28, pivotally mounted at the lower end of the hanger 25 and engaging with an annular groove 22′ in the hub 22″ of the mutilated pinion 22.

A crank pin 23‴ on the crank disk 23 extends into and travels in an elongated slot 29′ in one end of the box motion lever 29, which is pivotally mounted on a stud 30 on a stand 31 secured to the cross girt 27. The other end of the box motion lever is connected with the lower end of a rod 13′, forming a part of the flexible connection 13 to the box lifter rod 10, see Fig. 2.

Figure 9:
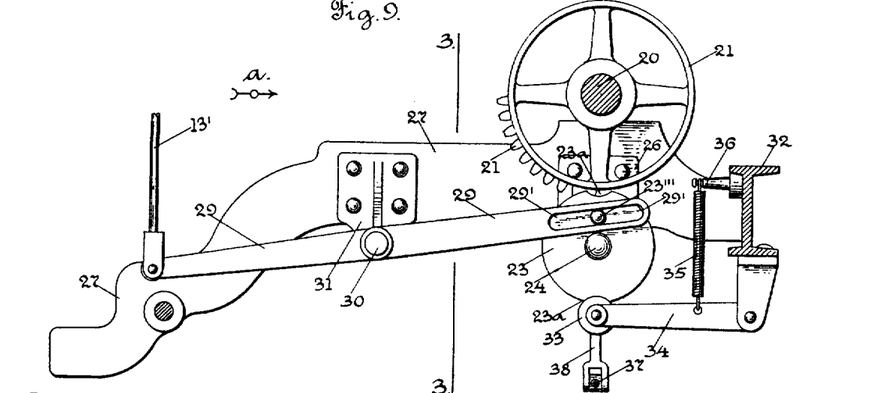
Fig. 9 is a section, on line 9, 9, Fig. 2, looking in the direction of arrow *f*, same figure.

The crank disk 23 has on its periphery, in this instance two recesses or depressions 23ª, on opposite sides of its axis, see Fig. 9, and a roll 33 on an arm 34 is adapted to extend into one of said recesses, in the revolution of the crank disk 23, to hold or lock said disk in its two opposite positions. A helically coiled contraction spring 35 is attached at one end to said arm 34, and at its other end to a stud 36 on the girt 32; said spring 35 acts to yieldingly hold the roll 33 on the arm 34 in engagement with the periphery of the disk 23.

To move the mutilated pinion 22 into and out of mesh with the master gear 21, I provide mechanism operated by the weaver at the desired time, or automatically operated by a pattern surface.

I will first describe the mechanism operated by the weaver. The lower end of the lever 28 is connected by a rod or connector 37 with one arm of an angle lever 38, which has its hub 38′ loosely mounted on a stud 39 on the lower end of a bracket or support 40 secured to the loom side, see Figs. 2, and 10. The other arm of the angle lever 38 is connected to the lower end of a rod or connector 41, which rod extends through a recess 42′ in an arm 42, which has a yoke-shaped end 42″ pivotally connected by a pin 43 with an extension 44′ on the hub 44″ of a hand lever 44, which has its hub 44″ pivotally mounted on a stud 45 on a stand 46 secured to the loom side, see Fig. 10.

Figures 2, 3:
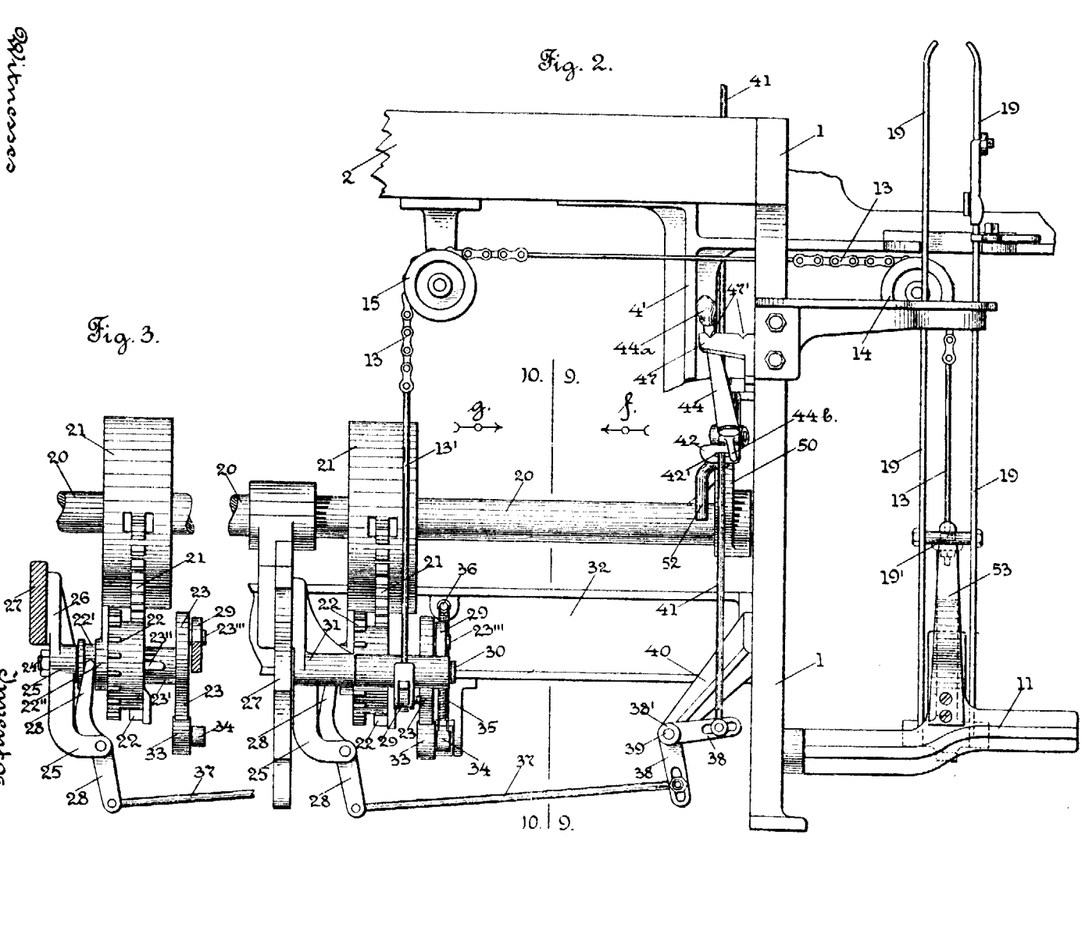
Fig. 2 shows a detached portion of the mechanism shown in Fig. 1, at the lower right hand part.
Fig. 3 is the mutilated gear mechanism shown at the left in Fig. 2, detached, and shown as a section, on line 3, 3, Fig. 9, looking in the direction of arrow *a*, same figure.

The hand lever 44 has a handle 44ª, preferably at the front of the loom, and a projection 44ª′ on the underside of the lever 44 is adapted to extend into either one of two V shaped recesses 47′ in a stand 47 secured to the loom side, see Fig. 2, to hold said hand lever in its two positions. A projection 44ᵇ on the hand lever 44, see Fig. 10, limits the downward movement of the arm 42. A collar 48, adjustably secured on the upright rod 41 by a set screw 49, extends over the arm 42. A cam 50 is fast on the bottom shaft 20, see Fig. 10, and when the hand lever 44 is moved into its operative position, to carry the arm 42 in the path of the periphery of the cam 50, as shown in Fig. 11, the revolution of said cam will raise the arm 42, from the position shown by broken lines in Fig. 10, to the position shown by full lines in said figure, and through the engagement of said arm 42 with the collar 48 on the rod 41, will rock the angle lever 38, and through the connector 37 move the lever 28 to slide the mutilated gear 22 on the sleeve 23' into the path of the teeth on the master gear 21, to cause a partial rotation of said sleeve and the crank disk 23, and the movement of the box lever 29, and of the shuttle boxes 9, 16, and 18.

Figures 10, 11, 12:
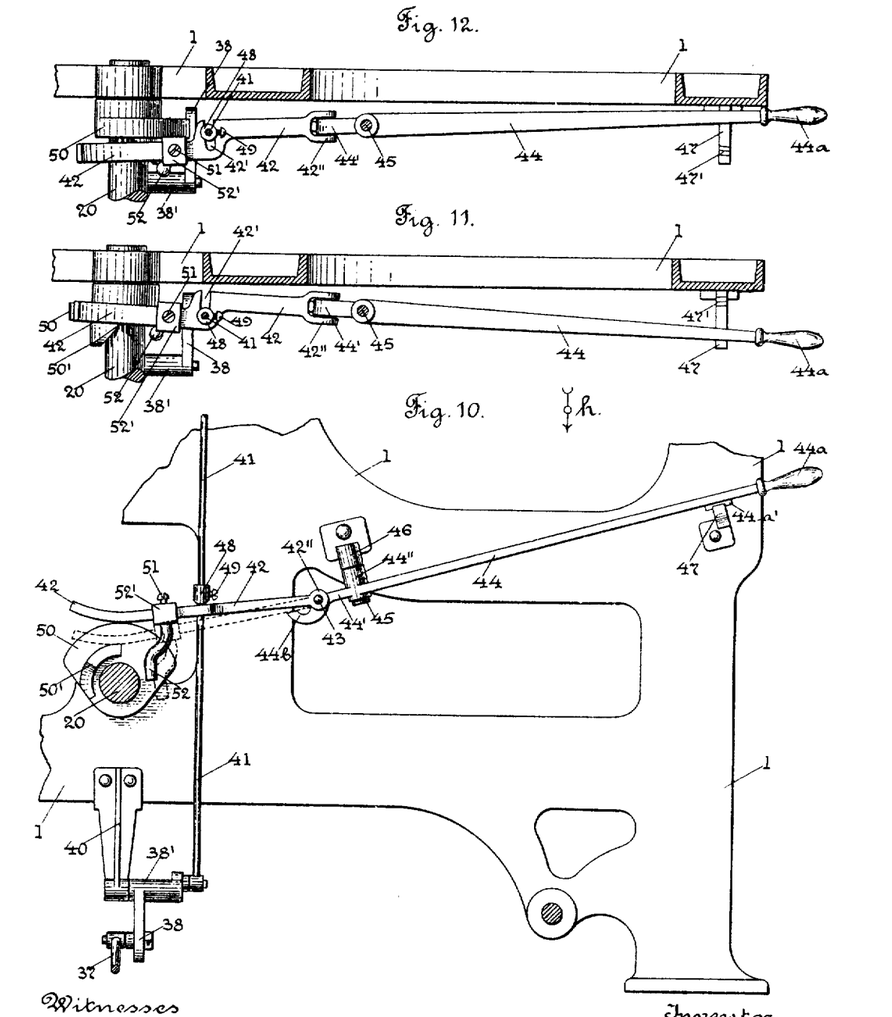
Fig. 10 is a section, on line 10, 10, Fig. 2, looking in the direction of arrow *g*, same figure.
Fig. 11 is a plan view of the parts shown in Fig. 10, looking in the direction of arrow *h*, same figure.
Fig. 12 shows the parts shown in Fig. 11, in a different position.

On the arm 42 is secured, by a set screw 51, a boss 52' on the upper end of a downwardly extending finger 52, see Fig. 10, and in the continued revolution of the cam 50 on the bottom shaft 20, the side cam portion 50' on the cam 50 will engage said finger 52, and move the arm 42 back to its inoperative position, shown in Fig. 12, after the shuttles have been exchanged and the extra shuttle boxes have been raised to their normal position, and also lever 44.

Figure 4:
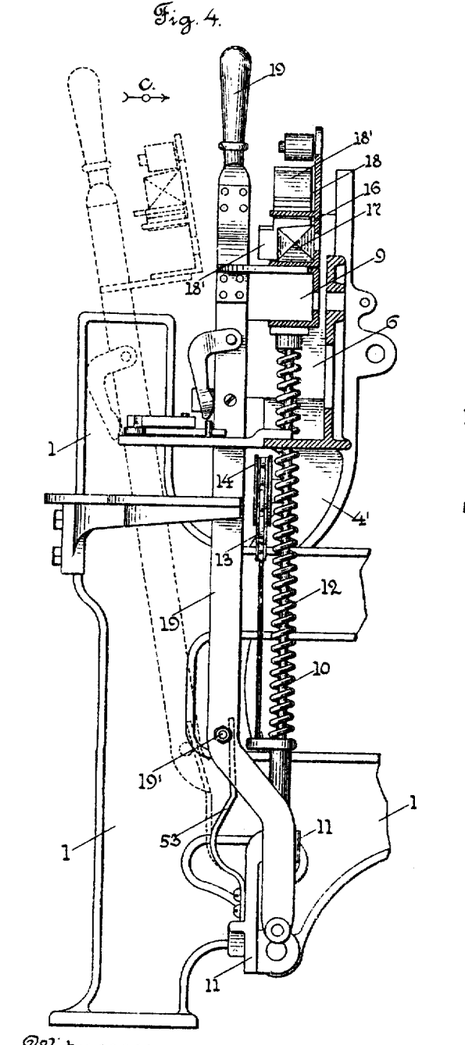
Fig. 4 is a section on line 4, 4, Fig. 1, looking in the direction of arrow *b*, same figure; the broken lines show the spare shuttle boxes in their inoperative position.
Figure 5:
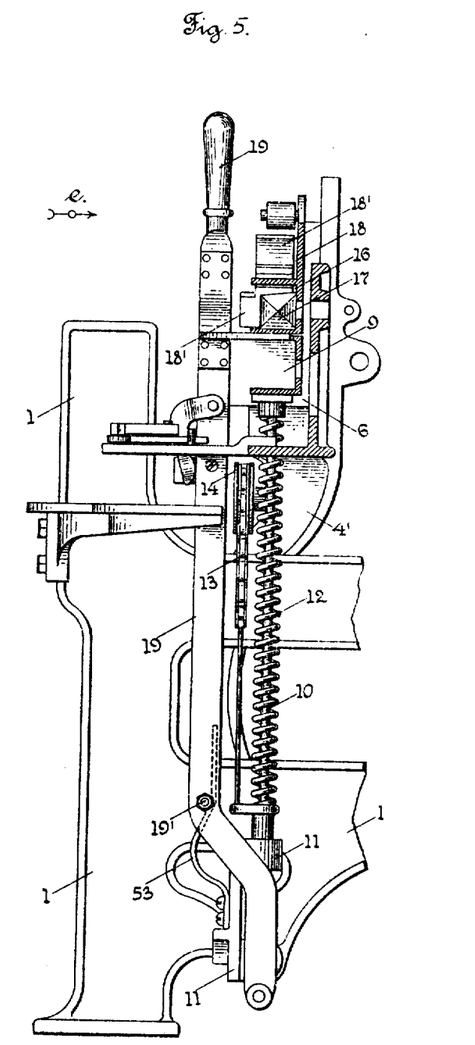
Fig. 5 corresponds to Fig. 4, but shows the boxes in their lower position, when the shuttle is to be exchanged.

The lower end of a flat spring blade 53 is secured to the rocker iron 11, see Fig. 4, the upper end of said spring 53 engages a stud or bolt 19' on the upright lever 19, and acts to move back the upright lever 19, and the shuttle boxes carried thereon, to their inoperative position, shown by broken lines in Fig. 4.

Figure 1:
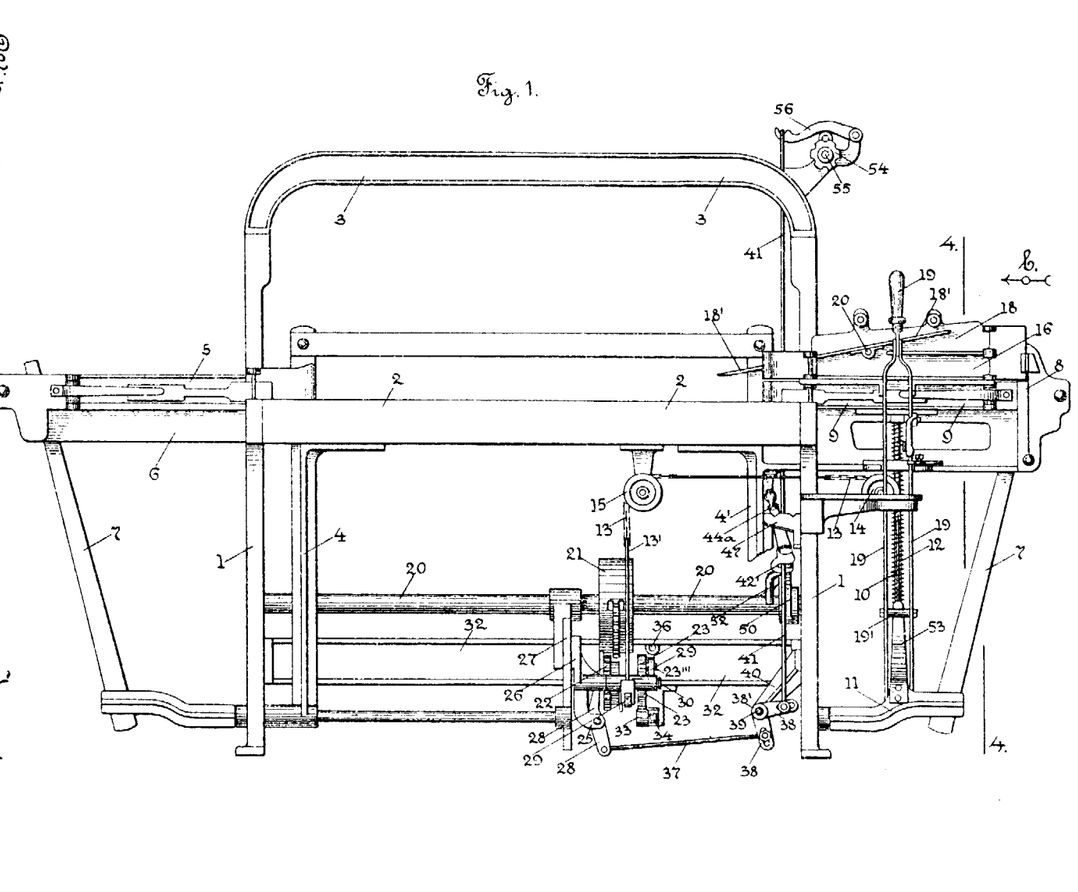
—Figure 1 is a front view of a loom having a single box, and a single box on the right hand end, and a drop and switch box mechanism, and my mechanism for operating the same, on the right hand end.

In case it is desired to operate the boxes automatically through a pattern surface, a pattern cylinder 54, suitably mounted on a stud 55, see Fig. 1, may be used, carrying any ordinary pattern surface, and adapted to operate a pattern indicator lever 56. The pattern indicator lever 56 is connected to the upper end of the rod 41, and the movement of said indicator lever 56 will move said rod 41, and through intermediate connections to the lever 28, will operate the mutilated pinion 22, to put into operation the shuttle box motion. The pattern chain may be so constructed that at predetermined intervals and after a certain number of picks, the shuttle box motion will be operated to bring the cell, to receive the exhausted shuttle in line with the race-way, and then to bring the shuttle having the spare cell therein in line with the race-way, to have said shuttle picked.

It will be understood that the details of construction of my improvements may be varied if desired, and they may be adapted to be applied to different types of looms.

Having thus described my invention, what I claim as new and desire to secure by Letters Patent is:—

1. In a shuttle changing loom, the combination with the lay, and a shuttle box or cell at one end of the lay, of an upright swinging lever or support, carrying a cell for the spare shuttle, and a cell for the shuttle to be exchanged, the cell for the shuttle to be exchanged having a tilting shelf or plate, pivotally mounted, with its inner end adapted to extend in the path of the shuttle on the race-way, to cause the shuttle to pass up said tilting plate into the cell for the shuttle to be exchanged.

2. In a shuttle changing loom, the combination with the lay, and a shuttle box or cell at one end of the lay, and means for raising and lowering said shuttle box, of a swinging lever or support, carrying a cell for the spare shuttle, and a second cell for the shuttle to be exchanged, said cells moving with said swinging lever, and the cell for the shuttle to be exchanged having a tilting shelf or plate pivotally mounted, with its inner end adapted to extend in the path of the shuttle on the race-way, to cause the shuttle to pass up said tilting plate into the cell for the shuttle to be exchanged.

3. In a shuttle changing loom, the combination with a shuttle box or cell at one end of the loom, and a swinging lever or support carrying a cell for the spare shuttle, and a cell for the shuttle to be exchanged, and adapted to be moved to bring said two cells in vertical alinement with the first mentioned cell, to move with said cell on the movement of the lay, of means to indicate for the raising and lowering of said cells, and means for automatically raising and lowering said cells.

4. In a shuttle changing loom, the combination with a shuttle box or cell at one end of the loom, and a swinging lever or support carrying a cell for the spare shuttle, and a cell for the shuttle to be exchanged, and adapted to be moved to bring said two cells in vertical alinement with the first mentioned cell, to move with said cell on the movement of the lay, of manually operated means to indicate for the raising and lowering of said cells, and means for automatically raising and lowering said cells.

5. In a shuttle changing loom, the combination with a shuttle box or cell at one end of the loom, and a swinging lever or support carrying a cell for the spare shuttle, and a cell for the shuttle to be exchanged, and adapted to be moved to bring said two cells in vertical alinement with the first mentioned cell to move with said cell on the movement of the lay, of manually operated means to indicate for the raising and lowering of said cells, and means for automatically raising and lowering said cells, and means, combined with the indicating means, to automatically return said indicating means to their normal inoperative position.

6. In a shuttle changing loom, the combination with a shuttle box or cell at one end of the loom, and a swinging lever or support carrying a cell for the spare shuttle, and a cell for the shuttle to be exchanged, and adapted to be moved to bring said two cells in vertical alinement with the first mentioned cell to move with said cell on the movement of the lay, of manually operated means to indicate for the raising and lowering of said cells, and means for automatically raising and lowering said cells, and means combined with the indicating means to automatically return the said indicating means to their normal inoperative position, said means consisting of a cam on a driven shaft, for putting into operation mechanism for raising and lowering the shuttle boxes, and a cam surface on said cam for putting out of operation the means for raising and lowering said shuttle boxes.

7. In a shuttle changing loom, the combination with a shuttle box or cell at one end of the loom, an upright swinging lever or support, carrying a cell for the spare shuttle, and a cell for the shuttle to be exchanged, said cells adapted to be moved into alinement and connected with the first mentioned shuttle box, of means for raising and lowering said cells at the proper time, said means consisting of a driven master gear, a mutilated pinion adapted to be moved into the path of said gear, a crank disk connected with said mutilated pinion, a lever connected with and operated by said crank disk, connections from said lever to a lifter rod connected with the shuttle box for the running shuttle, and means for moving said mutilated pinion into and out of operative position.

8. In a shuttle changing loom, the combination with a shuttle box or cell at one end of the loom, an upright swinging lever or support carrying a cell for the spare shuttle, and a cell for the shuttle to be exchanged, said cells adapted to be moved into alinement and connected with the first mentioned shuttle box, of means for raising and lowering said cells at the proper time, said means consisting of a driven master gear, a mutilated pinion adapted to be moved into the path of said gear, a crank disk connected with said mutilated pinion, a lever connected with and operated by said crank disk, connections from said lever to a lifter rod connected with the shuttle box for the running shuttle, and manually operated means for moving said mutilated pinion into operative position, and automatic means for moving it out of operative position.

BENJ. F. McGUINESS.

Witnesses:
JOHN C. DEWEY,
MINNA HAAS.

---

It is hereby certified that the name of the State of incorporation of the assignee, Crompton & Knowles Loom Works, in Letters Patent No. 943,038, granted December 14, 1909, upon the application of Benjamin F. McGuiness, of Worcester, Massachusetts, for an improvement in "Shuttle-Changing Looms," was erroneously written and printed "Maine," whereas said name should have been written and printed *Massachusetts;* and that the said Letters Patent should be read with this correction therein that the same may conform to the record of the case in the Patent Office.

Signed and sealed this 25th day of January, A. D., 1910.

[SEAL.]

C. C. BILLINGS,
*Acting Commissioner of Patents.*

6. In a shuttle changing loom, the combination with a shuttle box or cell at one end of the loom, and a swinging lever or support carrying a cell for the spare shuttle, and a cell for the shuttle to be exchanged, and adapted to be moved to bring said two cells in vertical alinement with the first mentioned cell to move with said cell on the movement of the lay, of manually operated means to indicate for the raising and lowering of said cells, and means for automatically raising and lowering said cells, and means combined with the indicating means to automatically return the said indicating means to their normal inoperative position, said means consisting of a cam on a driven shaft, for putting into operation mechanism for raising and lowering the shuttle boxes, and a cam surface on said cam for putting out of operation the means for raising and lowering said shuttle boxes.

7. In a shuttle changing loom, the combination with a shuttle box or cell at one end of the loom, an upright swinging lever or support, carrying a cell for the spare shuttle, and a cell for the shuttle to be exchanged, said cells adapted to be moved into alinement and connected with the first mentioned shuttle box, of means for raising and lowering said cells at the proper time, said means consisting of a driven master gear, a mutilated pinion adapted to be moved into the path of said gear, a crank disk connected with said mutilated pinion, a lever connected with and operated by said crank disk, connections from said lever to a lifter rod connected with the shuttle box for the running shuttle, and means for moving said mutilated pinion into and out of operative position.

8. In a shuttle changing loom, the combination with a shuttle box or cell at one end of the loom, an upright swinging lever or support carrying a cell for the spare shuttle, and a cell for the shuttle to be exchanged, said cells adapted to be moved into alinement and connected with the first mentioned shuttle box, of means for raising and lowering said cells at the proper time, said means consisting of a driven master gear, a mutilated pinion adapted to be moved into the path of said gear, a crank disk connected with said mutilated pinion, a lever connected with and operated by said crank disk, connections from said lever to a lifter rod connected with the shuttle box for the running shuttle, and manually operated means for moving said mutilated pinion into operative position, and automatic means for moving it out of operative position.

BENJ. F. McGUINESS.

Witnesses:
 JOHN C. DEWEY,
 MINNA HAAS.

---

It is hereby certified that the name of the State of incorporation of the assignee, Crompton & Knowles Loom Works, in Letters Patent No. 943,038, granted December 14, 1909, upon the application of Benjamin F. McGuiness, of Worcester, Massachusetts, for an improvement in "Shuttle-Changing Looms," was erroneously written and printed "Maine," whereas said name should have been written and printed *Massachusetts;* and that the said Letters Patent should be read with this correction therein that the same may conform to the record of the case in the Patent Office.

Signed and sealed this 25th day of January, A. D., 1910.

[SEAL.]

C. C. BILLINGS,
*Acting Commissioner of Patents.*

It is hereby certified that the name of the State of incorporation of the assignee, Crompton & Knowles Loom Works, in Letters Patent No. 943,038, granted December 14, 1909, upon the application of Benjamin F. McGuiness, of Worcester, Massachusetts, for an improvement in "Shuttle-Changing Looms," was erroneously written and printed "Maine," whereas said name should have been written and printed *Massachusetts;* and that the said Letters Patent should be read with this correction therein that the same may conform to the record of the case in the Patent Office.

Signed and sealed this 25th day of January, A. D., 1910.

[SEAL.]

C. C. BILLINGS,
*Acting Commissioner of Patents.*